United States Patent
Su et al.

(10) Patent No.: US 8,370,685 B2
(45) Date of Patent: Feb. 5, 2013

(54) ELECTRONIC DEVICE AND METHOD FOR TESTING SERIAL SIGNALS

(75) Inventors: Wang-Ding Su, Taipei Hsien (TW); Jui-Hsiung Ho, Taipei Hsien (TW); Yung-Cheng Hung, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 405 days.

(21) Appl. No.: 12/760,530

(22) Filed: Apr. 14, 2010

(65) Prior Publication Data
US 2011/0072308 A1 Mar. 24, 2011

(30) Foreign Application Priority Data
Sep. 18, 2009 (CN) .......................... 2009 1 0307328

(51) Int. Cl.
*G06F 11/00* (2006.01)
(52) U.S. Cl. .............................. 714/30; 714/25; 714/48
(58) Field of Classification Search .................... 714/30, 714/25, 48
See application file for complete search history.

(56) References Cited

U.S. PATENT DOCUMENTS

| | | | |
|---|---|---|---|
| 2005/0028040 A1* | 2/2005 | Perner | 714/42 |
| 2006/0245484 A1* | 11/2006 | Calvin et al. | 375/227 |
| 2010/0332931 A1* | 12/2010 | Stephens et al. | 714/738 |

* cited by examiner

*Primary Examiner* — Scott Baderman
*Assistant Examiner* — Sarai Butler
(74) *Attorney, Agent, or Firm* — Altis Law Group, Inc.

(57) ABSTRACT

An electronic device includes a serial signal test system to test serial signals generated by a serial signal generator. A test method tests serial signals using the electronic device. The test method sets test parameters that tests serial signals. Furthermore, the test method identifies an error bit from coded bits of each of the serial signals, and identifies abnormal attribute data of each of the serial signals. In addition, the test method generates a test report according to all identified error bits and abnormal attribute data.

18 Claims, 4 Drawing Sheets

ELECTRONIC DEVICE AND METHOD FOR TESTING SERIAL SIGNALS

BACKGROUND

1. Technical Field

Embodiments of the present disclosure generally relate to test systems and methods, and more particularly to an electronic device and method for testing serial signals using the electronic device.

2. Description of Related Art

A serial signal generator, such as a server and a computer, can generate serial signals to be transmitted to an electronic device. The serial signal generator may be performance tested using a serial signal test, before the serial signal generator is distributed to the consumer market.

However, presently, the serial signal test of the serial signal generator must be performed individually, and a lot of manual work are required to be done during the serial signal test. This serial signal test can be very inefficient and inaccurate, leading to an obscure performance test.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, each "step" described below, is operative under the controlling of a corresponding "module." The word "module," as described herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
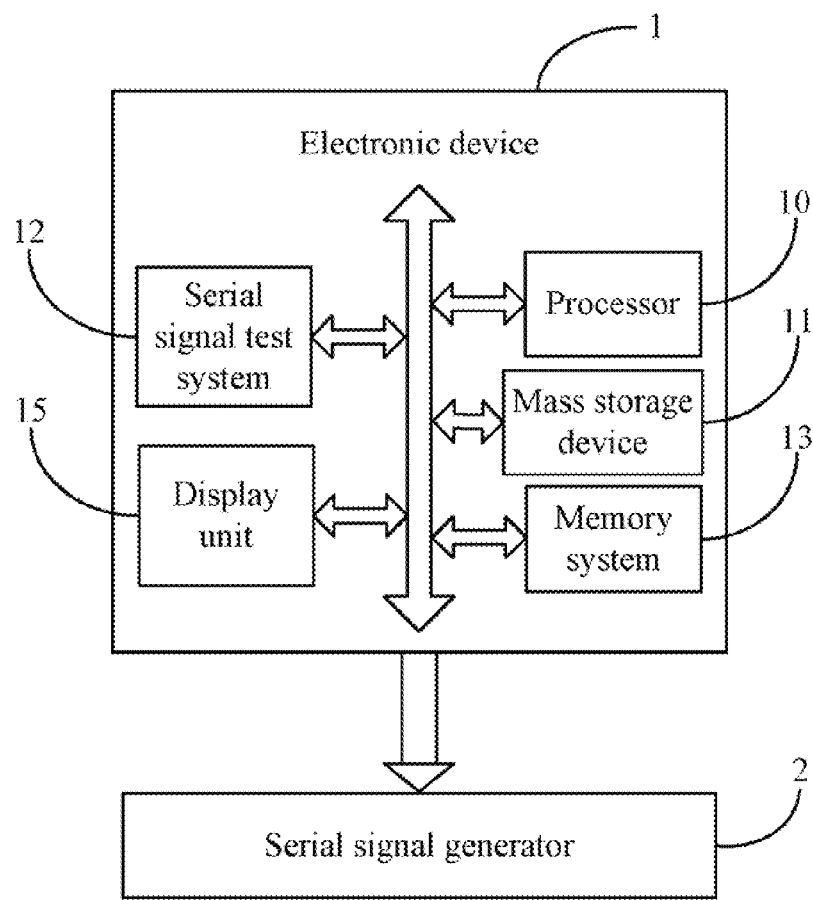
FIG. 1 is a block diagram of one embodiment of an electronic device comprising a serial signal test system.

FIG. 1 is a block diagram of one embodiment of an electronic device 1 in communication with a serial signal generator 2. The electronic device 1 includes a serial signal test system 12, and a display unit 15. The serial signal test system 12 tests serial signals generated by the serial signal generator 2. The display unit 15 generates a display interface showing a waveform of the serial signals.

The electronic device 1 may be a computer, a server, a mobile phone, an oscillograph, or a personal digital assistant (PDA), for example. In the embodiment, the electronic device 1 includes a memory system 13, such as a random access memory (RAM) for temporary storage of information and/or a read only memory (ROM) for permanent storage of information, and/or a mass storage device 11, such as a hard drive, or optical media storage device. The mass storage device 11 comprises one or more hard disk drives, optical drive, networked drive, or some combination of various digital storage systems. In the embodiment, the mass storage device 11 stores one or more computerized codes for the serial signal test system 12, serial signal data, and any data generated by the serial signal test system 12. The electronic device 1 may also include at least one processor 10 for computation during testing of serial signals. The memory system 13 or the mass storage device 11 includes one or more function modules to implement the serial signal test system 12. The components described may be connected by one or more communication buses or signal lines. It should be apparent that FIG. 1 is only one example of an architecture for the electronic device 1 that can be included with more or fewer components than shown, or a different configuration of the various components.

The electronic device 1 is generally controlled and coordinated by an operating system, such as UNIX, Linux, Windows 95, 98, NT, 2000, XP, Vista, Mac OS X, an embedded operating system, or any other compatible operating system. In other embodiments, the electronic device 1 may be controlled by a proprietary operating system.

Figure 2:
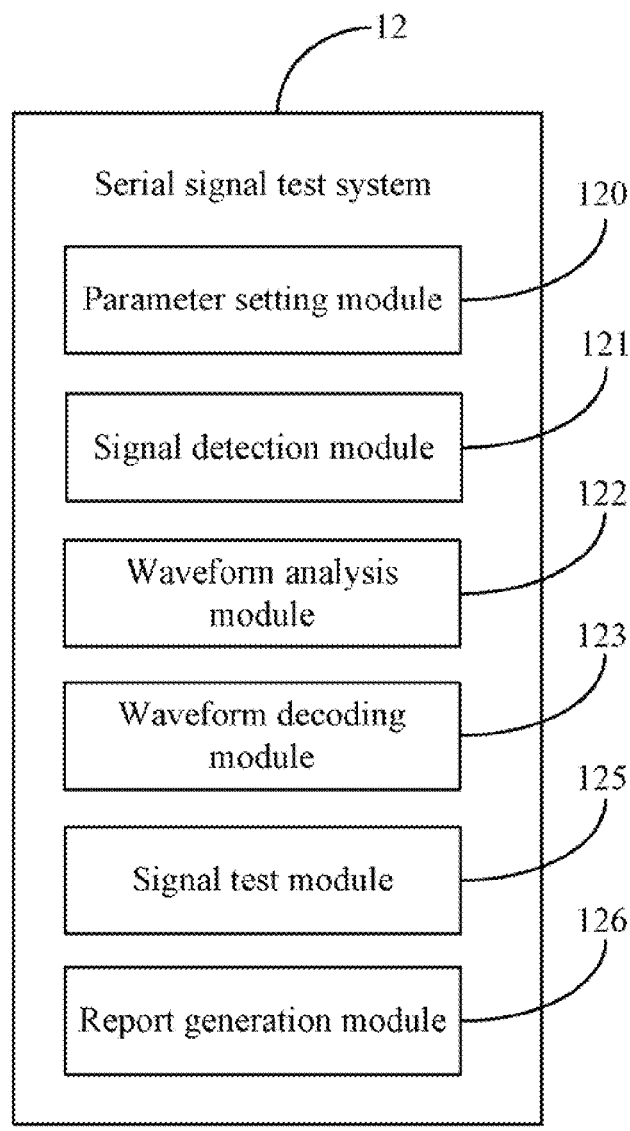
FIG. 2 is a block diagram of functional modules of the serial signal test system in FIG. 1.

FIG. 2 is a block diagram of the function modules of the serial signal test system 12. In one embodiment, the serial signal test system 12 includes a parameter setting module 120, a signal detection module 121, a waveform analysis module 122, a waveform decoding module 123, a signal test module 125, and a report generation module 126.

The parameter setting module 120 sets a plurality of test parameters that are used to test serial signals generated by the serial signal generator 2. In the embodiment, the set test parameters include serial signal types that need to be tested, test times for testing each of the serial signal types, standard coded bits corresponding to each of the serial signal types, and standard attribute data corresponding to each of the serial signal types. The standard attribute data includes a standard amplitude range of waveform jitters, a standard rise time range of a waveform, and a standard fall time range of a waveform. In the embodiment, the term "jitter" refers to a small rapid variation in a waveform resulting from a fluctuation of a serial signal.

The signal detection module 121 detects a serial signal generated by the serial signal generator 2 according to the test parameters. In the embodiment, the signal detection module 121 detects the serial signal generated by the serial signal generator 2, if the serial signal belongs to one of the serial signal types.

Figure 4:
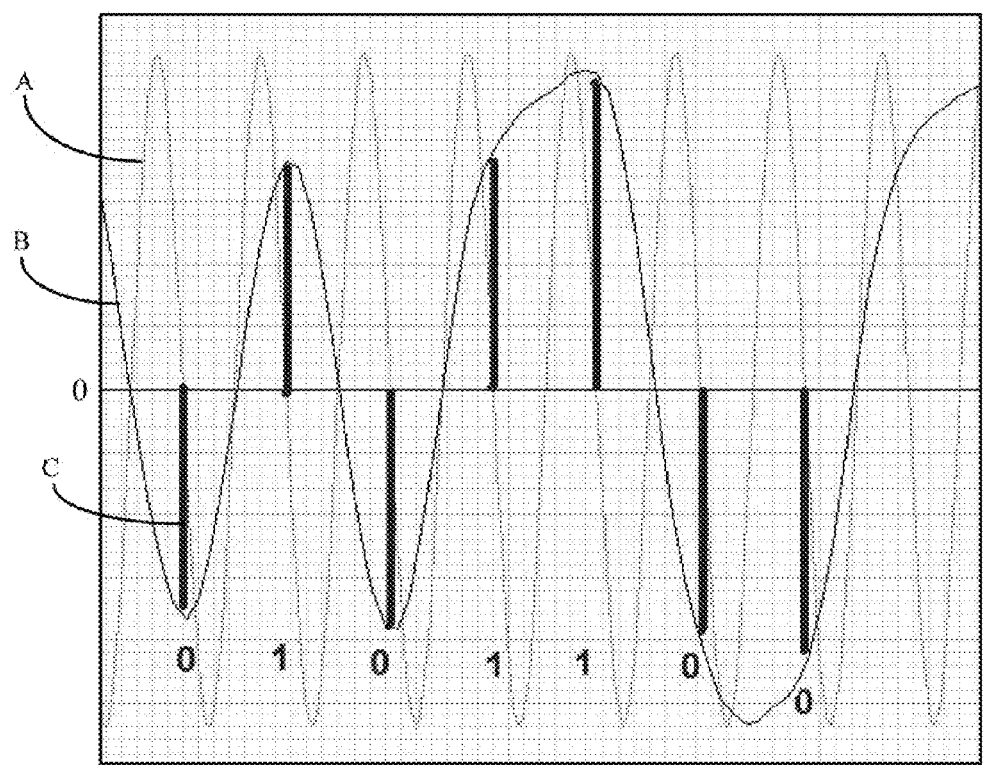
FIG. 4 illustrates a schematic graph diagram illustrating one embodiment of a waveform of serial signals.

The waveform analysis module 122 analyzes the detected serial signal by a least absolute difference algorithm, to generate a standard clock waveform, for example, the standard clock waveform "A" shown in FIG. 4. In the embodiment, the least absolute difference algorithm includes a step of setting a formula "$X_i=i/f$", where "f" denotes a standard clock frequency of the detected serial signal, "$X_i$" denotes the $i^{th}$ academic coordinate position of a clock waveform of the detected serial signal. Furthermore, the least absolute difference algorithm includes a step of setting a formula "$H_i=Y_i-X_i$", and a step of setting "$Z_i$" denotes a median of an error amount group consisting from "$H_1$" sequential to "$H_i$", where "$H_i$" denotes an error amount in the $i^{th}$ coordinate position of the clock waveform of the detected serial signal, and "$Y_i$" denotes the $i^{th}$ factual coordinate position of the clock waveform of the detected serial signal. In addition, the least absolute difference algorithm includes a step of setting a formula $$F = \sum_{i=1}^{n} |Y_i - Z_i - i/f|,$$

wherein a value of "f" that causes "F" to have a minimum value denotes the standard clock frequency.

The waveform decoding module 123 decodes the detected serial signal according to the standard clock waveform to generate coded bits of the detected serial signal. For example, as shown in FIG. 4, the waveform "B" denotes a waveform of the detected serial signal. In the embodiment, the waveform decoding module 123 traces a plurality of decode lines from an original line to the waveform of the detected serial signal. For example, as shown in FIG. 4, the lines "C" denote the plurality of decode lines, and the "0" scale mark line denotes the original line. The interval of two adjacent decode lines is a standard clock frequency. A decode line over the "0" scale mark line refers to a coded bit "1" of the detected serial signal, and a decode line under the "0" scale mark line refers to a coded bit "0" of the detected serial signal. For example, as shown in FIG. 4, the waveform decoding module 123 decodes the detected serial signal to generate coded bits "0101100".

The waveform decoding module 123 further analyzes the coded bits according to the test parameters, to identify an error bit from the coded bits. In the embodiment, the waveform decoding module 123 identifies an error bit from the coded bits, by comparing the coded bits with the standard coded bits corresponding to the detected serial signal.

The signal test module 125 tests the detected serial signal according to the test parameters, to identify abnormal attribute data of the detected serial signal. In the embodiment, the signal test module 125 identifies abnormal attribute data of the detected serial signal, by comparing factual attribute data of the detected serial signal with the standard attribute data corresponding to the detected serial signal.

The report generation module 126 analyzes whether any serial signals have been tested according to the test parameters, and generates a test report according to all identified error bits and abnormal attribute data. In the embodiment, the test report is outputted to the display unit 15 for display by the report generation module 126.

Figure 3:
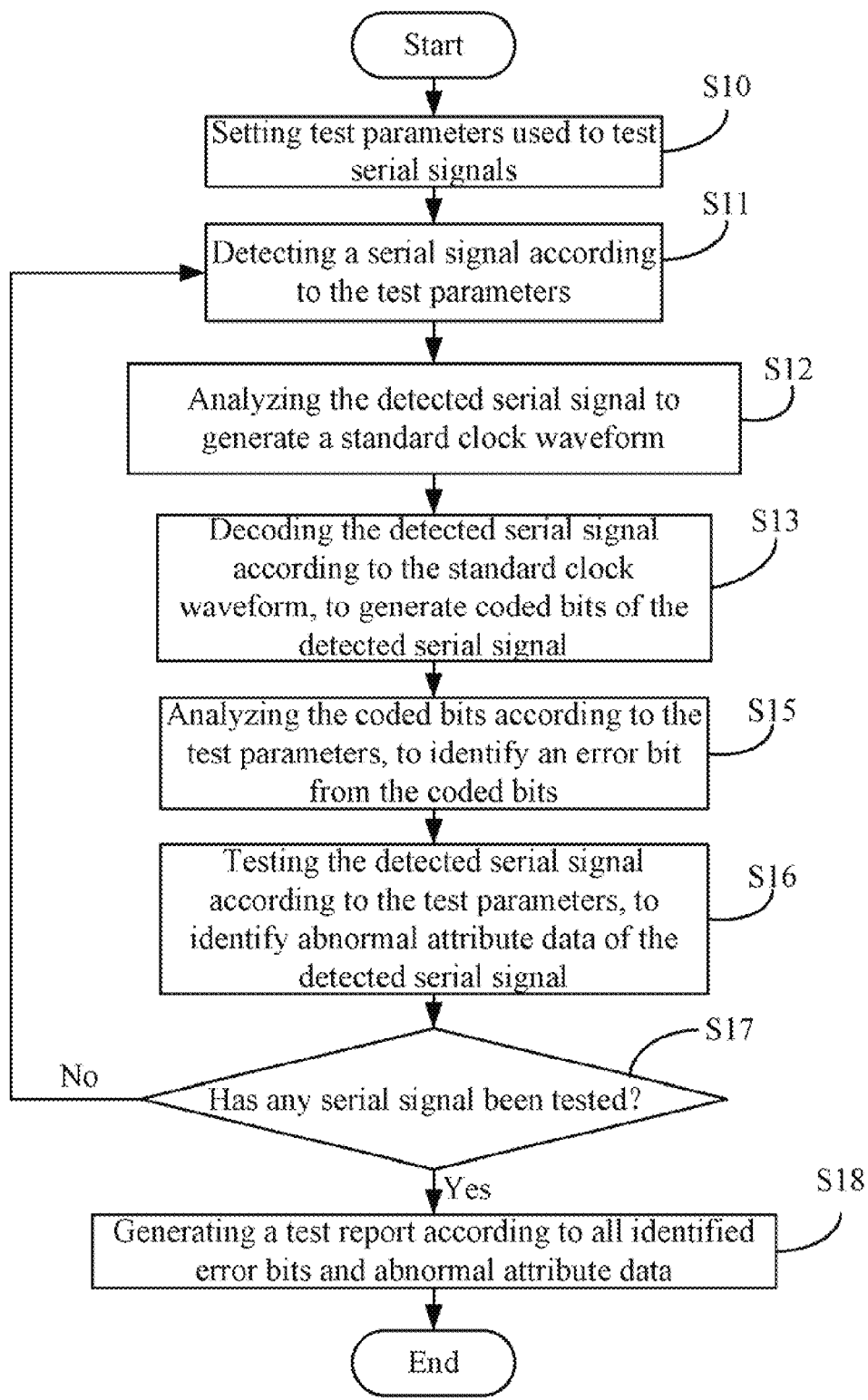
FIG. 3 is a flowchart illustrating one embodiment of a method for testing serial signals using an electronic device such as, for example, that of FIG. 1.

FIG. 3 is a flowchart illustrating one embodiment of a method for testing serial signals by using the electronic device 1 as described in FIG. 1. In the embodiment, the serial signal test system 12 comprises one or more computerized codes that are stored in the serial signal test system 12 and executable by the at least one processor 10 of the electronic device 1 to perform the method.

In block S10, the parameter setting module 120 sets a plurality of test parameters that are used to test serial signals. As described, the set test parameters include serial signal types that need to be tested, test times for testing each of the serial signal types, standard coded bits corresponding to each of the serial signal types, and standard attribute data corresponding to each of the serial signal types.

In block S11, the signal detection module 121 detects a serial signal generated by the serial signal generator 2, according to the test parameters. In the embodiment, the signal detection module 121 detects the serial signal generated by the serial signal generator 2, if the serial signal belongs to one of the serial signal types.

In block S12, the waveform analysis module 122 analyzes the detected serial signal by a least absolute difference algorithm, to generate a standard clock waveform, for example, the standard clock waveform "A" shown in FIG. 4.

In block S13, the waveform decoding module 123 decodes the detected serial signal according to the standard clock waveform, to generate coded bits of the detected serial signal.

In block S15, the waveform decoding module 123 analyzes the coded bits according to the test parameters, to identify an error bit from the coded bits. In the embodiment, the waveform decoding module 123 identifies an error bit from the coded bits, by comparing the coded bits with the standard coded bits corresponding to the detected serial signal.

In block S16, the signal test module 125 tests the detected serial signal according to the test parameters, to identify abnormal attribute data of the detected serial signal. In the embodiment, the signal test module 125 identifies the abnormal attribute data of the detected serial signal, by comparing factual attribute data of the detected serial signal with the standard attribute data corresponding to the detected serial signal.

In block S17, the report generation module 126 analyzes whether any serial signal has been tested according to the test parameters.

If all serial signals have been tested, block S18 is implemented. If any serial signal has not been tested, block S11 is repeated.

In block S18, the report generation module 126 generates a test report according to all identified error bits and abnormal attribute data.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:

at least one storage system and at least one processor; and a serial signal test system stored in the at least one storage system, and being executable by the at least one processor;

the serial signal test system comprising:

a parameter setting module operable to set test parameters that tests serial signals generated by a serial signal generator;

a signal detection module operable to detect each of the serial signals according to the test parameters;

a waveform analysis module operable to analyze the detected serial signal to generate a standard clock waveform by a least absolute difference algorithm;

a waveform decoding module operable to decode the detected serial signal to generate coded bits of the detected serial signal according to the standard clock waveform, and analyze the coded bits to identify an error bit by comparing the coded bits with the test parameters, the coded bits being generated by tracing a plurality of decode lines from an original line to a waveform of the detected serial signal, wherein an interval of any two adjacent decode lines is a standard clock frequency, recording a coded bit "1" when one of the decode lines is over the original line, and recording a coded bit "0" when one of the decode lines is under the original line;

a signal test module operable to test the detected serial signal to identify abnormal attribute data of the detected serial signal according to the test parameters; and a report generation module operable to generate a test report according to all identified error bits and abnormal attribute data.

2. The electronic device as described in claim 1, wherein the test parameters comprise serial signal types, test times for testing each of the serial signal types, standard coded bits corresponding to each of the serial signal types, and standard attribute data corresponding to each of the serial signal types.

3. The electronic device as described in claim 2, wherein the waveform decoding module identifies an error bit from the coded bits, by comparing the coded bits with the standard coded bits corresponding to the detected serial signal.

4. The electronic device as described in claim 2, wherein the signal test module identifies the abnormal attribute data of the detected serial signal, by comparing factual attribute data of the detected serial signal with the standard attribute data corresponding to the detected serial signal.

5. The electronic device as described in claim 4, wherein the standard attribute data comprises a standard amplitude range of waveform jitters, a standard rise time range of a waveform, and a standard fall time range of a waveform.

6. The electronic device as described in claim 1, wherein the standard clock waveform is generated by:
setting a formula "$X_i=i/f$", where "f" denotes a standard clock frequency of the detected serial signal, "$X_i$" denotes the $i^{th}$ academic coordinate position of a clock waveform of the detected serial signal;
setting a formula "$H_i=Y_i-X_i$", wherein "$H_i$" denotes an error amount in the $i^{th}$ coordinate position of the clock waveform of the detected serial signal, and "$Y_i$" denotes the $i^{th}$ factual coordinate position of the clock waveform of the detected serial signal;
setting "$Z_i$" which denotes a median of an error amount group consisting from "$H_1$" sequential to "$H_i$"; and
setting a formula $$"F = \sum_{i=1}^{n} |Y_i - Z_i - i/f|",$$

wherein a value of "f" that causes "F" to have a minimum value denotes the standard clock frequency.

7. A method for testing serial signals using an electronic device, the method comprising:
(i1) setting test parameters;
(i2) detecting a serial signal generated by a serial signal generator according to the test parameters;
(i3) analyzing the detected serial signal to generate a standard clock waveform by a least absolute difference algorithm;
(i4) decoding the detected serial signal to generate coded bits of the detected serial signal according to the standard clock waveform, the coded bits being generated by tracing a plurality of decode lines from an original line to a waveform of the detected serial signal, wherein an interval of any two adjacent decode lines is a standard clock frequency, recording a coded bit "1" when one of the decode lines is over the original line, and recording a coded bit "0" when one of the decode lines is under the original line;
(i5) analyzing the coded bits to identify an error bit by comparing the coded bits with the test parameters;
(i6) testing the detected serial signal to identify abnormal attribute data of the detected serial signal according to the test parameters;
(i7) repeating steps (i2) through (i6) until all the serial signals generated by the serial signal generator have been tested;
(i8) generating a test report according to all identified error bits and abnormal attribute data.

8. The method as described in claim 7, wherein the test parameters comprise serial signal types, test times for testing each of the serial signal types, standard coded bits corresponding to each of the serial signal types, and standard attribute data corresponding to each of the serial signal types.

9. The method as described in claim 8, wherein the error bit from the coded bits is identified by comparing the coded bits with the standard coded bits corresponding to the detected serial signal.

10. The method as described in claim 8, wherein the abnormal attribute data of the detected serial signal is identified by comparing factual attribute data of the detected serial signal with the standard attribute data corresponding to the detected serial signal.

11. The method as described in claim 10, wherein the standard attribute data comprises a standard amplitude range of waveform jitters, a standard rise time range of a waveform, and a standard fall time range of a waveform.

12. The method as described in claim 7, wherein the standard clock waveform is generated by:
setting a formula "$X_i=i/f$", where "f" denotes a standard clock frequency of the detected serial signal, "$X_i$" denotes the $i^{th}$ academic coordinate position of a clock waveform of the detected serial signal;
setting a formula "$H_i=Y_i-X_i$", wherein "$H_i$" denotes an error amount in the $i^{th}$ coordinate position of the clock waveform of the detected serial signal, and "$Y_i$" denotes the $i^{th}$ factual coordinate position of the clock waveform of the detected serial signal;
setting "$Z_i$" which denotes a median of an error amount group consisting from "$H_1$" sequential to "$H_i$"; and
setting a formula $$"F = \sum_{i=1}^{n} |Y_i - Z_i - i/f|",$$

wherein a value of "f" that causes "F" to have a minimum value denotes the standard clock frequency.

13. A non-transitory machine-readable storage medium having stored thereon instructions that, when executed by a processor of an electronic device, cause the electronic device to perform a method for testing serial signals, wherein the method comprises:
(i1) setting test parameters that tests the serial signals;
(i2) detecting a serial signal generated by a serial signal generator according to the test parameters;
(i3) analyzing the detected serial signal to generate a standard clock waveform by a least absolute difference algorithm;
(i4) decoding the detected serial signal to generate coded bits of the detected serial signal according to the standard clock waveform, the coded bits being generated by tracing a plurality of decode lines from an original line to a waveform of the detected serial signal, wherein an interval of any two adjacent decode lines is a standard clock frequency, recording a coded bit "1" when one of the decode lines is over the original line, and recording a coded bit "0" when one of the decode lines is under the original line;
(i5) analyzing the coded bits to identify an error bit by comparing the coded bits with the test parameters;
(i6) testing the detected serial signal to identify abnormal attribute data of the detected serial signal according to the test parameters;

(i7) repeating steps (i2) through (i6) until all the serial signals generated by the serial signal generator have been tested;

(i8) generating a test report according to all identified error bits and abnormal attribute data.

14. The non-transitory machine-readable storage medium as described in claim 13, wherein the test parameters comprise serial signal types, test times for testing each of the serial signal types, standard coded bits corresponding to each of the serial signal types, and standard attribute data corresponding to each of the serial signal types.

15. The non-transitory machine-readable storage medium as described in claim 14, wherein the error bit from the coded bits is identified by comparing the coded bits with the standard coded bits corresponding to the detected serial signal.

16. The non-transitory machine-readable storage medium as described in claim 14, wherein the abnormal attribute data of the detected serial signal is identified by comparing factual attribute data of the detected serial signal with the standard attribute data corresponding to the detected serial signal.

17. The non-transitory machine-readable storage medium as described in claim 16, wherein the standard attribute data comprises a standard amplitude range of waveform jitters, a standard rise time range of a waveform, and a standard fall time range of a waveform.

18. The non-transitory machine-readable storage medium as described in claim 13, wherein the standard clock waveform is generated by:

setting a formula "$X_i = i/f$", where "f" denotes a standard clock frequency of the detected serial signal, "$X_i$" denotes the $i^{th}$ academic coordinate position of a clock waveform of the detected serial signal;

setting a formula "$H_i = Y_i - X_i$", wherein "$H_i$" denotes an error amount in the $i^{th}$ coordinate position of the clock waveform of the detected serial signal, and "$Y_i$" denotes the $i^{th}$ factual coordinate position of the clock waveform of the detected serial signal;

setting "$Z_i$" which denotes a median of an error amount group consisting from "$H_1$" sequential to "$H_i$";

setting a formula $$F = \sum_{i=1}^{n} |Y_i - Z_i - i/f|,$$

wherein a value of "f" that causes "F" to have a minimum value denotes the standard clock frequency.

* * * * *